(12) United States Patent
Ono et al.

(10) Patent No.: US 10,346,730 B2
(45) Date of Patent: Jul. 9, 2019

(54) OUTPUT APPARATUS, SYSTEM, AND NON-TRANSITORY COMPUTER READABLE STORAGE MEDIUM OUTPUTTING DIFFERENT FORMS BASED ON EXPIRATION OF AN OUTPUT TIME LIMIT

(71) Applicant: FUJI XEROX CO., LTD., Tokyo (JP)

(72) Inventors: Masafumi Ono, Kanagawa (JP); Keita Sakakura, Kanagawa (JP)

(73) Assignee: FUJI XEROX CO., LTD., Minato-Ku, Tokyo (JP)

( * ) Notice: Subject to any disclaimer, the term of this patent is extended or adjusted under 35 U.S.C. 154(b) by 0 days.

(21) Appl. No.: 15/984,925

(22) Filed: May 21, 2018

(65) Prior Publication Data

US 2018/0268270 A1    Sep. 20, 2018

Related U.S. Application Data

(63) Continuation of application No. 15/487,657, filed on Apr. 14, 2017, now Pat. No. 9,978,006.

(30) Foreign Application Priority Data

Jul. 26, 2016  (JP) .................................. 2016-146830

(51) Int. Cl.
| | |
|---|---|
| *G06F 15/00* | (2006.01) |
| *G06F 3/12* | (2006.01) |
| *G06K 1/00* | (2006.01) |
| *G06K 15/02* | (2006.01) |
| *G06Q 20/14* | (2012.01) |

(52) U.S. Cl.
CPC ......... *G06K 15/186* (2013.01); *G06F 3/1203* (2013.01); *G06F 3/1204* (2013.01); *G06F 3/1222* (2013.01); *G06F 3/1238* (2013.01); *G06F 3/1243* (2013.01); *G06F 3/1268* (2013.01); *G06F 3/1275* (2013.01); *G06F 3/1285* (2013.01); *G06F 3/1288* (2013.01); *G06Q 20/14* (2013.01); *G06F 3/1239* (2013.01)

(58) Field of Classification Search
CPC ... G06K 15/186; G06F 3/1203; G06F 3/1222; G06F 3/1238; G06F 3/1268; G06F 3/1275; G06F 3/1288; G06Q 20/14
USPC ............................... 358/1.1, 1.15, 1.13, 1.14
See application file for complete search history.

(56) References Cited

U.S. PATENT DOCUMENTS

| | | | |
|---|---|---|---|
| 8,397,161 B1 * | 3/2013 | Shah ..................... | G06F 17/218 715/234 |
| 2008/0117456 A1 | 5/2008 | Yamaguchi | |
| 2014/0333960 A1 * | 11/2014 | Fukasawa .......... | G06K 15/1817 358/1.15 |
| 2016/0150104 A1 | 5/2016 | Wagatsuma | |
| 2017/0019565 A1 | 1/2017 | Shiratori | |

FOREIGN PATENT DOCUMENTS

JP    2008-131267 A    6/2008

* cited by examiner

*Primary Examiner* — Douglas Q Tran
(74) *Attorney, Agent, or Firm* — Sughrue Mion, PLLC

(57) ABSTRACT

An output apparatus including an acquisition unit configured to acquire document data having an output time limit and identification information used for identification; and an output unit configured to output the document data in a first output form of the identification information when the output time limit has elapsed, which is different from a second output form of the identification information before expiration of the output time limit.

6 Claims, 12 Drawing Sheets

OUTPUT APPARATUS, SYSTEM, AND NON-TRANSITORY COMPUTER READABLE STORAGE MEDIUM OUTPUTTING DIFFERENT FORMS BASED ON EXPIRATION OF AN OUTPUT TIME LIMIT

CROSS-REFERENCE TO RELATED APPLICATIONS

This application is a Continuation of U.S. patent application Ser. No. 15/487,657, filed on Apr. 14, 2017, which claims priority under 35 USC 119 from Japanese Patent Application No. 2016-146830 filed Jul. 26, 2016.

BACKGROUND

Technical Field

The present invention relates to an output apparatus, a system, and a non-transitory computer readable storage medium.

SUMMARY

According to an aspect of the invention, an output apparatus includes an acquisition unit configured to acquire document data having an output time limit and identification information used for identification; and an output unit configured to output the document data in a first output form of the identification information when the output time limit has elapsed, which is different from a second output form of the identification information before expiration of the output time limit.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described with reference to the accompanying drawings.

Exemplary Embodiment 1

[System Configuration]

Figure 1:
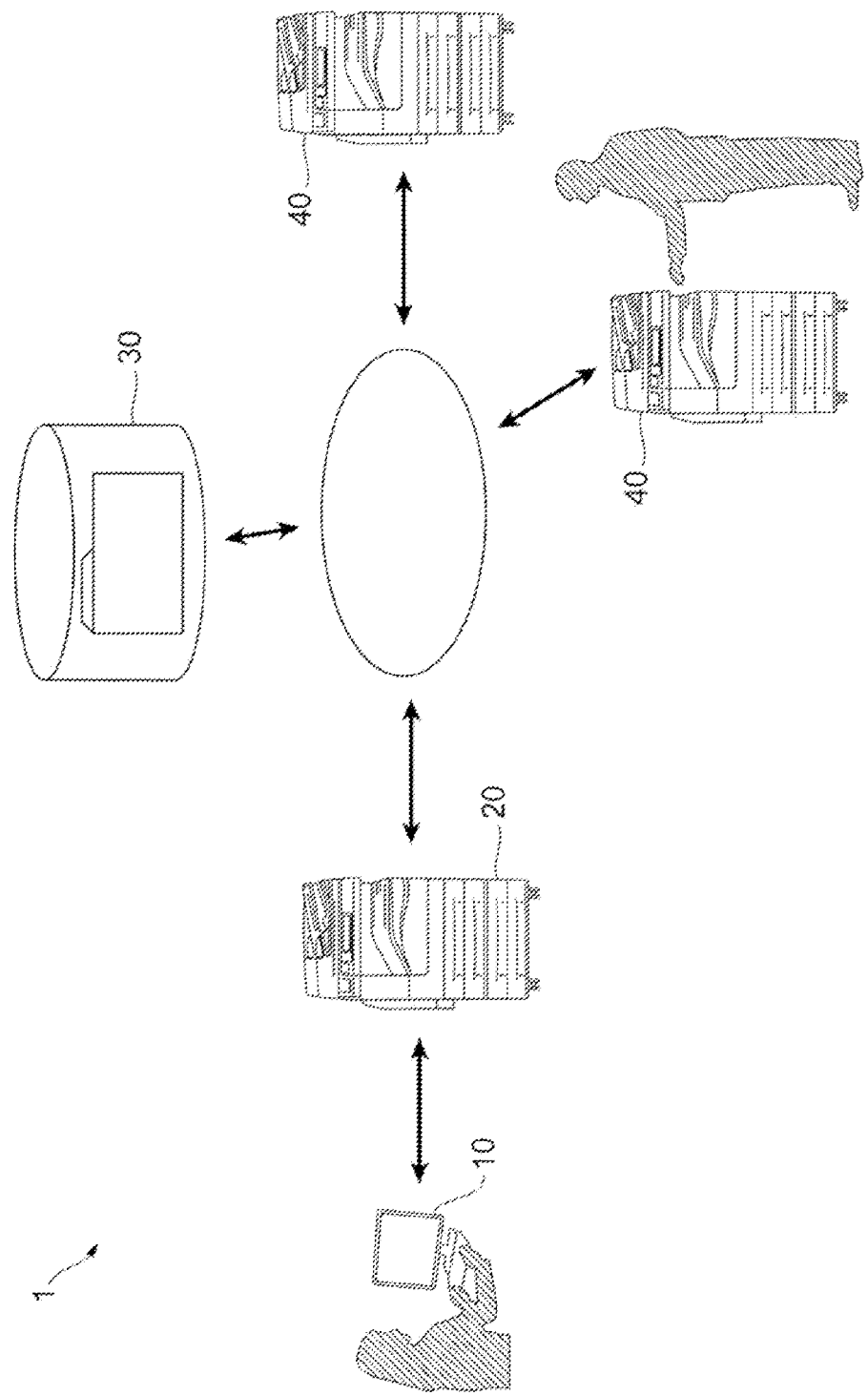
FIG. 1 is a view illustrating an exemplary configuration of a document transmitting/receiving system of an exemplary embodiment 1.

FIG. 1 is a view illustrating an exemplary configuration of a document transmitting/receiving system of an exemplary embodiment 1.

As illustrated in FIG. 1, a document transmitting/receiving system 1 of the exemplary embodiment 1 includes a terminal device 10, a first image processing apparatus 20, a management server 30, and plural second image processing apparatuses 40. The terminal device 10, the first image processing apparatus 20, the management server 30, and the second image processing apparatuses 40 are data-connected to each other directly or through a network.

In the document transmitting/receiving system 1 of the exemplary embodiment 1, a sender transmits a document from the first image processing apparatus 20 to one of the second image processing apparatuses 40 through the terminal device 10. Specifically, the sender first creates a document by using the terminal device 10. The created document is transmitted from the first image processing apparatus 20 to the second image processing apparatus 40 via the management server 30. Then, the document is printed on paper in the second image processing apparatus 40 and received by a recipient.

As described above, in the document transmitting/receiving system 1 of the exemplary embodiment 1, the first image processing apparatus 20 functions like a mailbox in which a sender puts a mail, and the second image processing apparatus 40 functions like a mailbox at which a recipient receives the mail. In addition, the document transmitting/receiving system 1 implements an electronic postal service (hereinafter, referred to as the "present service") of transmitting and receiving a document through the plural image processing apparatuses. In the present service, a recipient may receive a document from any of the plural second image processing apparatuses 40 installed at any places.

In addition, in the document transmitting/receiving system 1 of the exemplary embodiment 1, a sender may set an expiration period in which a recipient is permitted to print a document (hereinafter, referred to as a "printing time limit"). In addition, a printing mode of a document changes to be different before and after a printing time limit elapses.

The setting of a printing time limit of a document will be described in detail later.

In addition, in the exemplary embodiment 1, the second image processing apparatus 40 (an example of an output apparatus) functions as an example of an acquiring unit and an output unit. In addition, the terminal device 10 or the first image processing apparatus 20 functions as an example of a transmitting unit and a setting unit.

In the exemplary embodiment 1, a document refers to a document written with information that may be recognized by a perception of a person such as characters, signs, and images. In addition, document data includes letter data that becomes a letter when the letter data is printed on paper. Here, the letter refers to a document presenting a sender's will or notifying a fact to a specific recipient.

Examples of the letter may include an official letter, an invoice, a seal registration certificate, a copy of a resident's card, and a direct mail written with a recipient's name.

Examples of documents other than the letter may include a catalog and a direct mail written with no recipient's name.

In addition, the document created by the sender is kept the same in contents but a data format thereof changes until the recipient receives the document. In the descriptions hereinafter, for convenience of descriptions, a document as electronic data may be generally referred to as "document data," regardless of the data format of the document. In addition, a printout which is obtained by printing the document data on paper or the like will be referred to as a "paper printing document."

At this time, the first image processing apparatus 20 and the second image processing apparatus 40 are identical to each other in basic configuration. In the descriptions hereinafter, the first image processing apparatus 20 is a machine used when a sender sends a document (hereinafter, referred to as a "sender side machine"). Meanwhile, the second image processing apparatus 40 is a machine used when a recipient receives a document (hereinafter, referred to as a "recipient side machine").

Here, the second image processing apparatus 40 may be the sender side machine, and the first image processing apparatus 20 may be the recipient side machine. However, when all the cases where any one of the first image processing apparatus 20 and the second image processing apparatus 40 is the sender side machine, and the other is the recipient side machine are described, the functional configurations will overlap with each other thereby causing descriptions of the functional configurations to be complicated. Hence, descriptions will be made assuming that the first image processing apparatus 20 is the sender side machine, and the second image processing apparatus 40 is the recipient side machine.

The terminal device 10 creates the document data with a predetermined application or the like through an operation by the sender. The terminal device 10 sends the created document data to the first image processing apparatus 20. As the terminal device 10, for example, an installed personal computer (PC) or a portable terminal such as a mobile phone or a tablet terminal may be used.

The first image processing apparatus 20 is a so-called multifunction machine and has functions such as copying, printing (image forming), image reading, and faxing. Further, the first image processing apparatus 20 has a function to transmit the document data created by the sender and relevant information related to the transmission of the document data to the management server 30, as one of the functions to implement the present service.

The management server 30 stores the document data and the relevant information related to the transmission/reception of the document data which are acquired from the first image processing apparatus 20. Then, the management server 30 transmits the stored document data to the second image processing apparatus 40 based on an instruction from the recipient.

The second image processing apparatus 40 is a so-called multifunction machine and has functions such as copying, printing (image forming), image reading, and faxing. Further, the second image processing apparatus 40 prints the document data received from the management server 30, as one of the functions to implement the present service.

Figure 2:
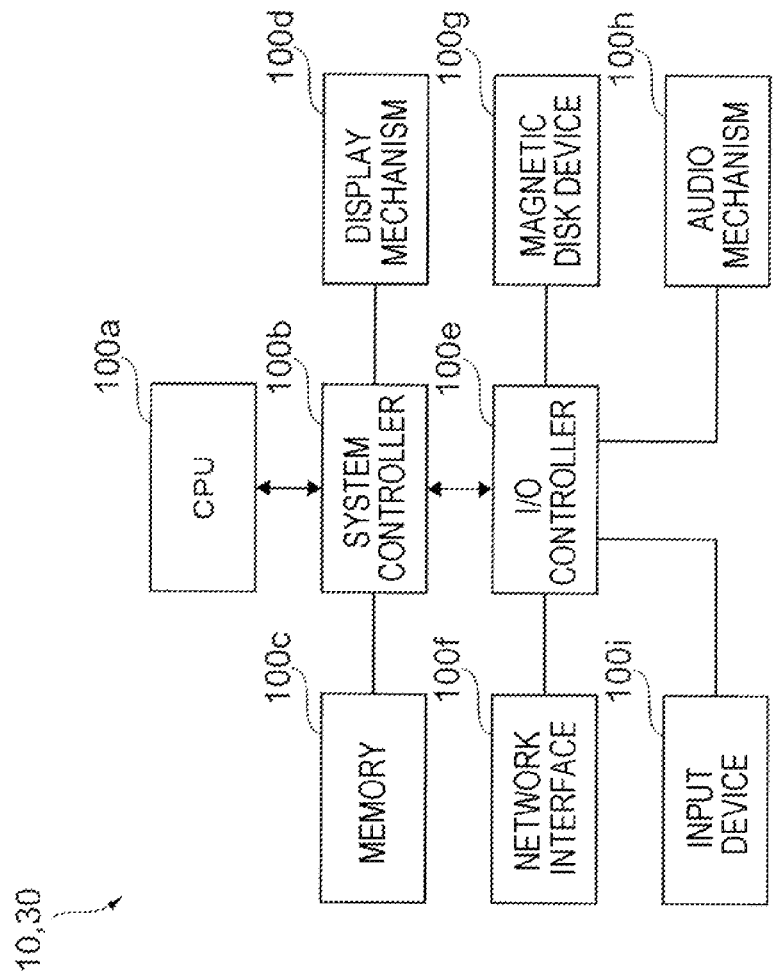
FIG. 2 is a view illustrating an exemplary hardware configuration of a terminal device and a management server.

FIG. 2 is a view illustrating an exemplary hardware configuration of the terminal device 10 and the management server 30.

As illustrated in FIG. 2, each of the terminal device 10 and the management server 30 includes a central processing unit (CPU) 100a as an arithmetic operation unit and a memory 100c as a main memory. Further, each of the terminal device 10 and the management server 30 includes, for example, a magnetic disk device (hard disk drive (HDD)) 100g, a network interface 100f, a display mechanism 100d, an audio mechanism 100h, and an input device 100i such as a keyboard or a mouse, as external devices.

The memory 100c and the display mechanism 100d are connected to the CPU 100a through a system controller 100b. In addition, the network interface 100f, the magnetic disk device 100g, the audio mechanism 100h, and the input device 100i are connected to the system controller 100b through an I/O controller 100e. The components are connected to each other by various buses such as a system bus or an input/out bus.

The magnetic disk device 100g stores a program to implement each of the functions. The program is loaded to the memory 100c, and processing based on the program is performed by the CPU 100a so that the various functions are implemented.

[Hardware Configuration of First Image Processing Apparatus 20 and Second Image Processing Apparatus 40]

Figure 3:
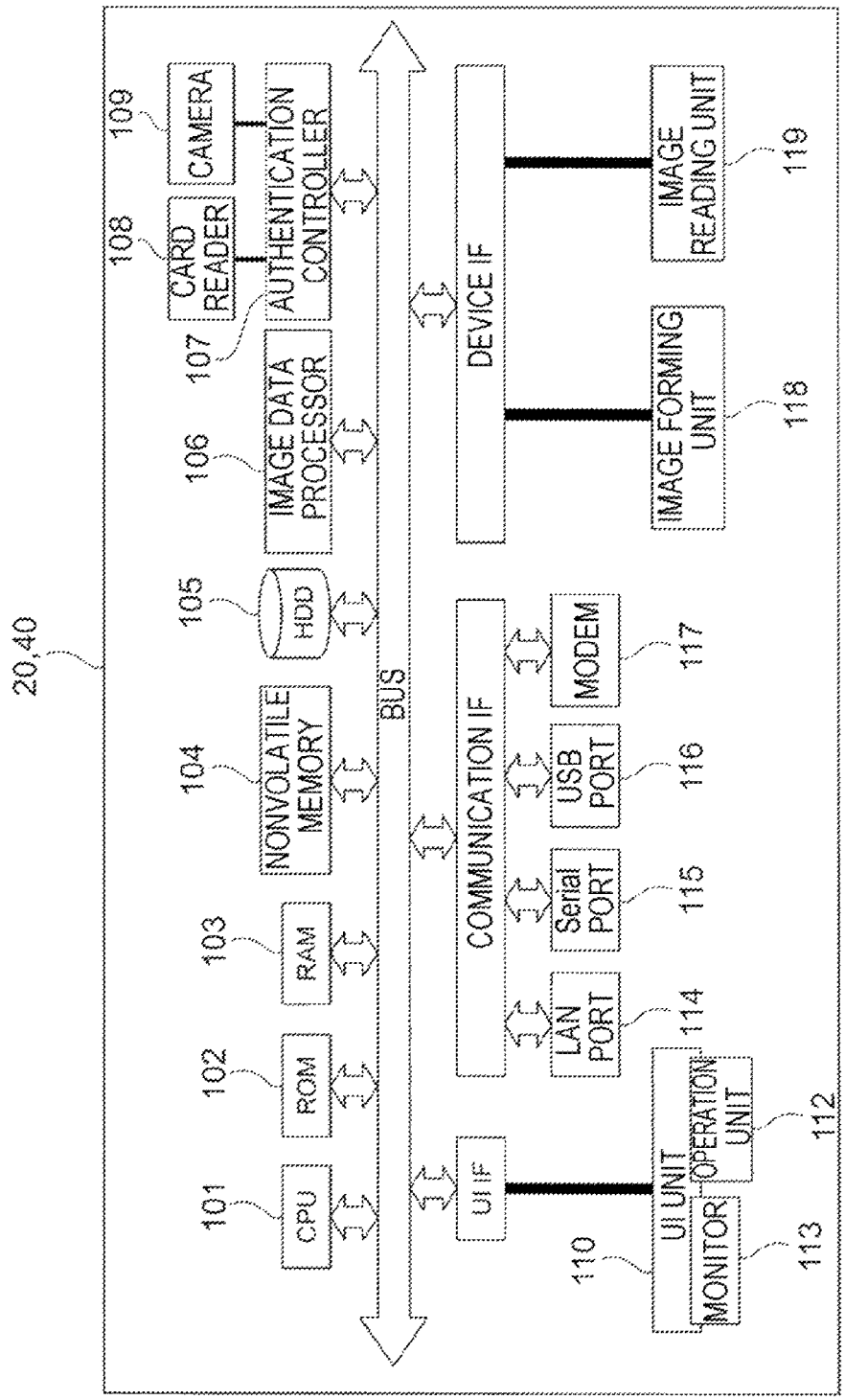
FIG. 3 is a view illustrating an exemplary hardware configuration of a first image processing apparatus and a second image processing apparatus.

FIG. 3 is a view illustrating an exemplary hardware configuration of the first image processing apparatus 20 and the second image processing apparatus 40.

As illustrated in FIG. 3, a CPU 101 performs a main control of the first image processing apparatus 20 and the second image processing apparatus 40, by loading various programs stored in, for example, a read only memory (ROM) 102 to a random access memory (RAM) 103 and executing the programs, so as to implement the functions of each of the first image processing apparatus 20 and the second image processing apparatus 40. The ROM 102 is a memory that stores, for example, various programs to be executed by the CPU 101 or predetermined fixed data. The RAM 103 is a memory that is used as, for example, a working memory for the CPU 101. A nonvolatile memory 104 is a memory that may hold the stored information even when a power is not supplied, and stores parameters or various history data to be used for an image adjustment.

The HDD 105 is, for example, a magnetic disk device and stores, for example, image data read by an image reading unit 119 or image data to be used for an image formation in an image forming unit 118 to be described later.

An image data processor 106 performs processing for image data such as decompression/compression of image data. An authentication controller 107 controls a card reader 108 and a camera 109. The card reader 108 reads an IC card equipped with an integrated circuit (IC) therein for recording information or performing an arithmetic operation, so as to acquire information recorded in the IC card. In addition, the camera 109 captures an image including a user operating the UI unit 110.

The UI unit 110 includes an operation unit 112 that receives a contact operation by a user and a monitor 113 that displays various images.

The operation unit 112 receives an instruction from a user for image processing functions of each of the first image processing apparatus 20 and the second image processing apparatus 40 such as a printing function, a scanning function, a copying function, a facsimile function, and a document transmitting/receiving function.

A local area network port (LAN) port 114 is an interface for inputting and outputting data with respect to the outside. In the exemplary embodiment 1, the LAN port 114 also functions as a wireless communication interface. A serial port 115 is an interface for a connection of an external peripheral device. A universal serial bus (USB) port 116 is an interface for a connection of a peripheral device through a USB cable. A modem 117 is a controller to be connected to a public line, such as a facsimile, and enables providing various facsimile functions.

The image forming unit 118 forms an image on paper or the like as an example of a recording medium. The image reading unit 119 reads the image recorded on the paper or the like.

Subsequently, the functional configurations of the respective components related to the document transmitting/receiving system 1 will be described in detail.

[Functional Configuration of Terminal Device 10]

In the exemplary embodiment 1, the terminal device 10 is connected to the first image processing apparatus 20. A printer driver is installed in the terminal device 10 to operate the first image processing apparatus 20. The terminal device 10 is configured to enable operating the image forming unit 118 or the image reading unit 119 in the first image processing apparatus 20 or using the present service through the first image processing apparatus 20.

In addition, in the terminal device 10, a sender creates a document file by using, for example, a predetermined application. The document file is data serving as the base for a paper printing document which is to be finally sent to a recipient. Then, the terminal device 10 converts the document file created by the sender into page-description language (PDL) data. In addition, the terminal device 10 transmits the PDL data to the first image processing apparatus 20.

[Functional Configuration of First Image Processing Apparatus 20]

Figure 4:
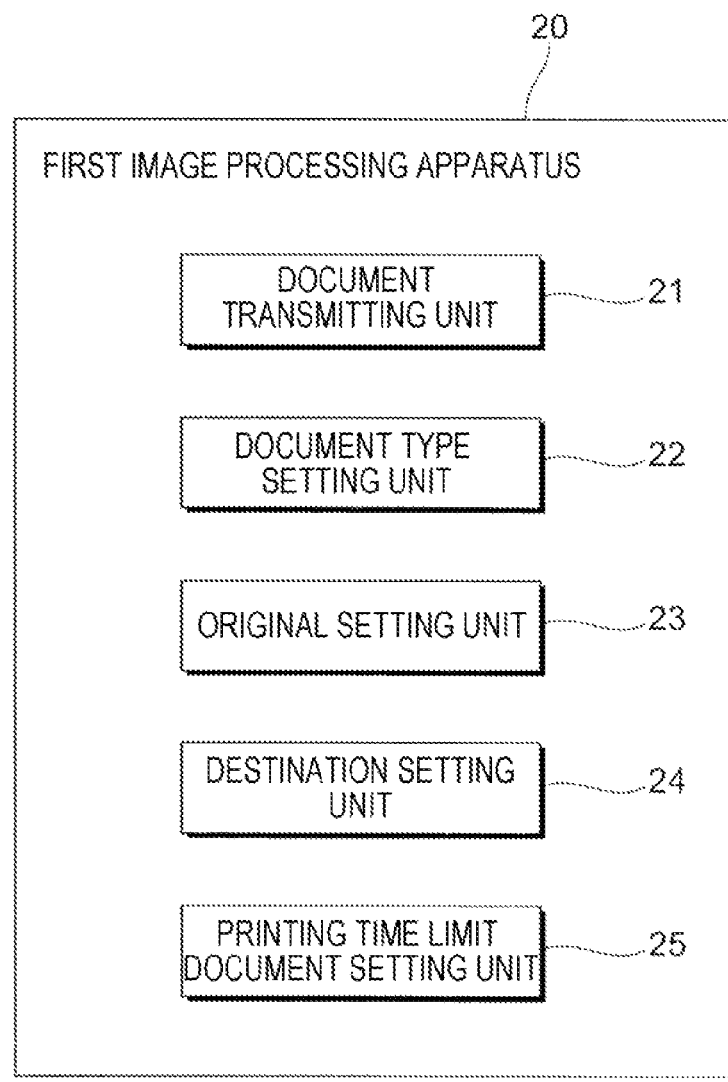
FIG. 4 is a functional block diagram of the first image processing apparatus of the exemplary embodiment 1.

FIG. 4 is a functional block diagram of the first image processing apparatus 20 of the exemplary embodiment 1.

As illustrated in FIG. 4, the first image processing apparatus 20 includes a document transmitting unit 21 that transmits a document image, a document type setting unit 22 that sets a type of a document, an original setting unit 23 that assures the originality, a destination setting unit 24 that sets a destination to which document data is to be transmitted, and a printing time limit document setting unit 25 that specifically sets printing time limit transmission/reception to be described later.

The document transmitting unit 21 creates a document image (an image file) based on the PDL data of the document acquired from the terminal device 10. Then, the document transmitting unit 21 transmits the created document image to the management server 30.

The document type setting unit 22 sets transmission/reception types of the document. In the exemplary embodiment 1, the transmission/reception types include "ordinary transmission/reception" and "printing time limit transmission/reception."

The "ordinary transmission/reception" is ordinary transmission/reception other than the printing time limit transmission/reception. The "printing time limit transmission/reception" is transmission/reception for which a printing time limit is set to permit a recipient to print a document image in the ordinary format.

The original setting unit 23 performs an original setting for a paper printing document to assure that the paper printing document is the original. When receiving an instruction from the sender to perform the original setting for a paper printing document, the original setting unit 23 transmits original setting information which is instruction information for the original setting, to the management server 30.

The destination setting unit 24 sets destination information which is information of the recipient of the document. Then, the destination setting unit 24 transmits the destination information in association with the document image, to the management server 30.

Here, the destination of document data is not limited to a specific individual, and a company or a specific department of a company may be set as a destination. In addition, the destination setting unit 24 may directly select a recipient side machine by using information that may designate a specific image processing apparatus connected to a network, and transmit document data to the recipient side machine as a destination.

When the printing time limit transmission/reception is set as a type of document data, the printing time limit document setting unit 25 sets a printing time limit designated by a sender for document data. More specifically, when the printing time limit transmission/reception is set, the printing time limit document setting unit 25 issues a printing password (a token) corresponding to target document data. The issued printing password is notified to a recipient.

The printing password enables the printing of a document image. Here, in the exemplary embodiment 1, printing a document image means printing contents of an original document image as they are. Meanwhile, not printing a document image includes a case where a document image is not printed, and a case where at least part of contents of an original document image is changed and printed, rather than printing the contents of the original document image as they are.

In addition, the printing time limit document setting unit 25 sets the expiration period in the printing password itself. Accordingly, the printing time limit document setting unit 25 sets a printing time limit for a document image.

In addition, the printing time limit document setting unit 25 sets a printing mode after a printing time limit of document data elapses. The printing time limit document setting unit 25 sets a printing mode for a case where a document image is printed after a printing time limit elapses to be different from a printing mode for a case where the document image is printed before the printing time limit elapses. In the exemplary embodiment 1, a sender designates the printing mode. However, a recipient may set the printing mode.

Here, the change of the printing mode before and after a printing time limit elapses will be described in detail later.

Subsequently, descriptions will be made on a send screen displayed on the display mechanism. 100d of the terminal device 10 when a sender uses the present service. Here, the send screen is displayed by a printer driver of the first image processing apparatus 20.

Figure 5A:
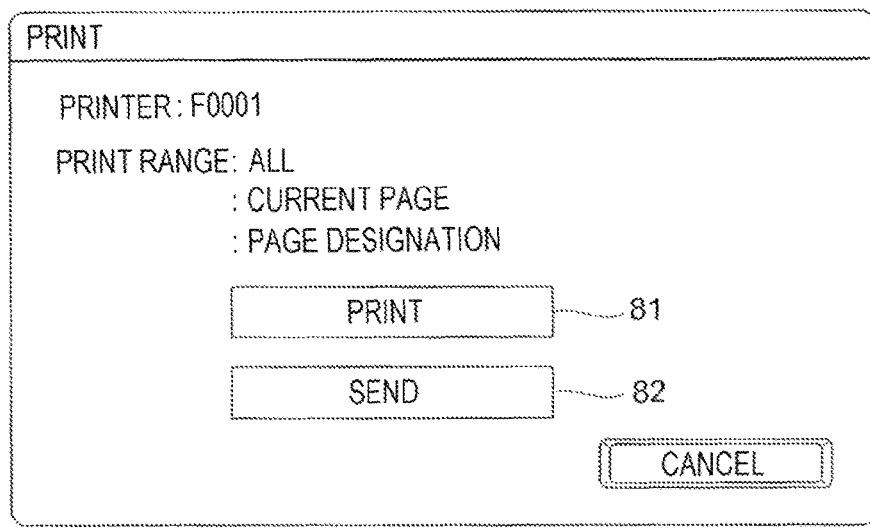
FIGS. 5A and 5B are views of an exemplary document send screen of the exemplary embodiment 1.
Figure 5B:
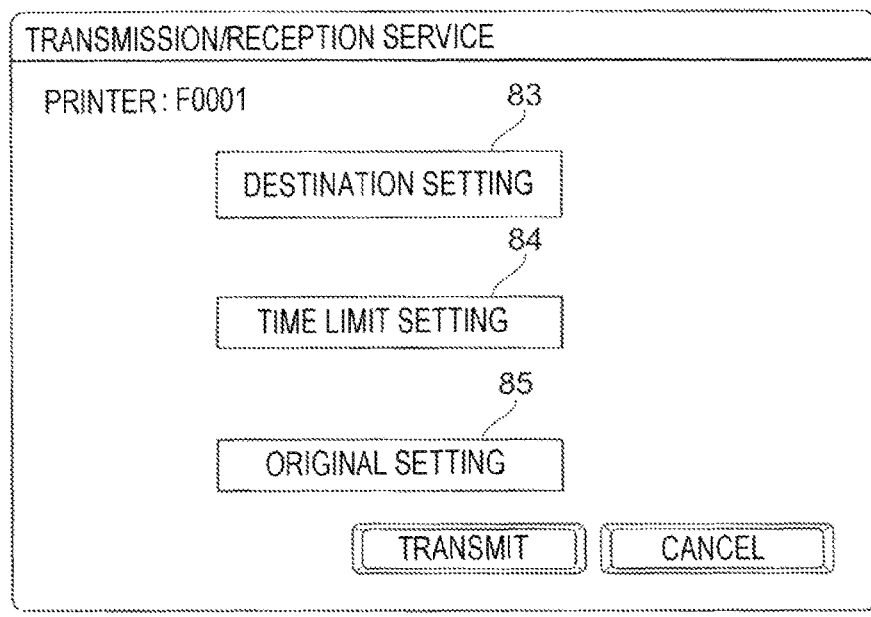

FIGS. 5A and 5B are views of an example of the document send screen of the exemplary embodiment 1.

For example, a screen for performing printing in the first image processing apparatus 20 is opened from the menu of the application of the terminal device 10. Then, as illustrated in FIG. 5A, the screen displays a print button 81 and a send button 82. The print button 81 is a button for printing the document image in the first image processing apparatus 20. Meanwhile, the send button 82 is a button for sending the document to the recipient through the first image processing apparatus 20.

Then, when the send button 82 is selected, the send screen for sending the document is displayed as illustrated in FIG. 5B. The send screen includes a destination setting button 83 for setting a destination, a time limit setting button 84 for setting a printing time limit of a document image, and an original setting button 85 for performing an original setting for a paper printing document.

The destination setting button 83 is used to set a recipient or a recipient side machine. When the destination setting button 83 is pressed, a list of recipient names is displayed. A sender designates a recipient name to which a document is to be transmitted. The designated recipient name information is transmitted to the first image processing apparatus 20 as destination information.

The time limit setting button 84 is used to set a printing time limit for a document image which is an object to be transmitted. When the time limit setting button 84 is pressed, a predetermined input screen is displayed, and time limit information such as date and time or designation of a printing mode of a document image after a printing time limit elapses is received. Then, the printing time limit setting information for setting the printing time limit is transmitted to the first image processing apparatus 20.

The original setting button 85 is used to perform an original setting for a paper printing document based on the document to be transmitted. When the original setting button 85 is pressed, original setting information for performing a setting to assure the originality of a paper printing document is transmitted to the first image processing apparatus 20.

[Functional Configuration of Management Server 30]

Figure 6:
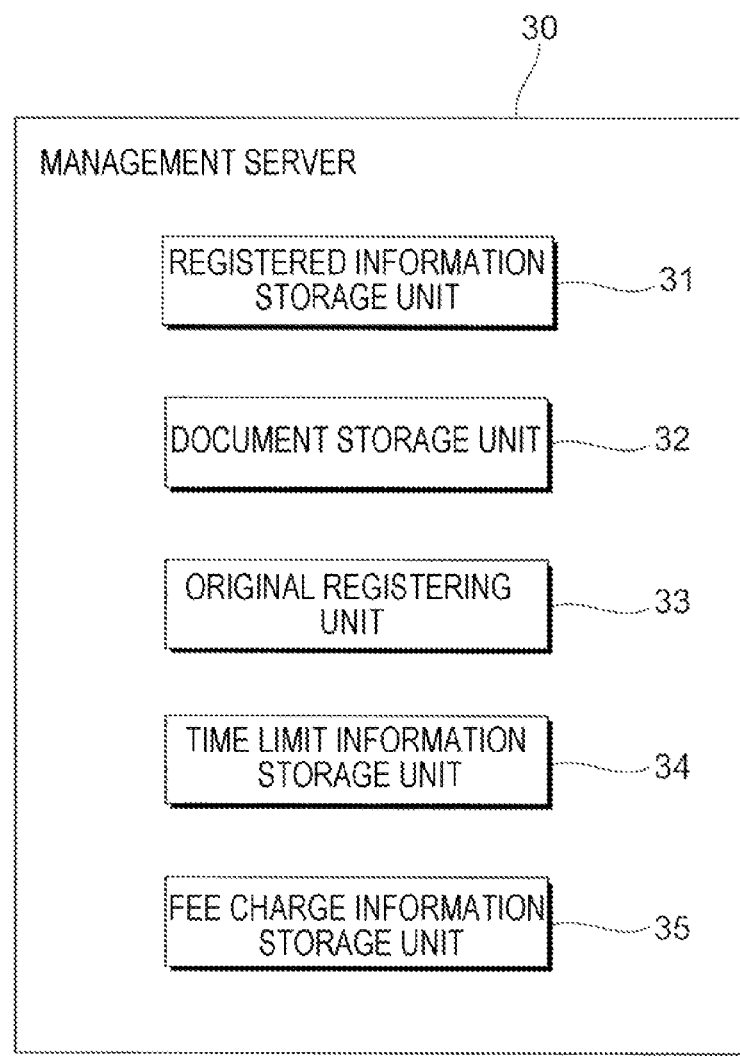
FIG. 6 is a functional block diagram of the management server of the exemplary embodiment 1.

FIG. 6 is a functional block diagram of the management server 30 of the exemplary embodiment 1.

As illustrated in FIG. 6, the management server 30 includes a registered information storage unit 31 that stores registered information for use of the present service, a document storage unit 32 that stores a document image, an original registering unit 33 that registers the originality of a paper printing document, a time limit information storage unit 34 that stores information about a printing time limit of a document image, and a fee charge information storage unit 35 (an example of a fee charging unit) that stores information of fee charge related to transmission/reception.

The registered information storage unit 31 stores user information such as a registered name of a user using the present service (e.g., a registered company name), a user ID, and a use password. The registered information storage unit 31 enables the stored registered information to be referred to when a recipient performs a log-in authentication in the second image processing apparatus 40.

In addition, the registered information storage unit 31 stores attribute information of a service registrant (e.g., an individual or a company). The attribute information is used when a recipient of a direct mail is set, as described later. The attribute information includes registrant attribute information related to a service registrant, and machine attribute information related to a recipient side machine.

The document storage unit 32 stores the document image received from the first image processing apparatus 20. In addition, the document storage unit 32 stores the destination information of the document in association with the document image. Then, the document storage unit 32 transmits the stored document image to the second image processing apparatus 40 according to a request from the second image processing apparatus 40.

The original registering unit 33 registers the original of the document image for which the original setting has been performed. In order to assure the originality of a paper printing document, the original registering unit 33 stores information that may identify the document image which is the base for a paper printing document and a paper printing document corresponding to the document image. In the exemplary embodiment 1, the original registering unit 33 creates an identification information image (an example of predetermined information) to identify that the paper printed document is the original. The identification information image is an image that may uniquely specify the paper printing document. The original registering unit 33 stores the document image and the identification information image in association with each other.

In addition, the original registering unit 33 stores a printing history which is a printing history of the document image in the second image processing apparatus 40. In the exemplary embodiment 1, when a certain document image is printed for the first time, the original registering unit 33 transmits the identification information image corresponding to the document image to the second image processing apparatus 40. At this time, when second or more printings of the document image are performed, the original registering unit 33 does not transmit the corresponding identification information image to the second image processing apparatus 40. That is, in the exemplary embodiment 1, the originality is assured only for the paper printing document which is printed for the first time.

In addition, in assuring the originality of the paper printing document, the identification information image may not be necessarily printed directly on the paper printing document. For example, when the document image is printed, a paper fingerprint of printing paper is read in advance. Then, the original registering unit 33 may store the information of the paper fingerprint in association with the document image so as to manage the originality of the paper printing document.

In addition, the number of the printing times of the paper printing document for assuring the originality is not limited to one time and may be a predetermined number of times.

The time limit information storage unit 34 stores a printing time limit for a document image when the printing time limit has been set for the document image. In the exemplary embodiment 1, the time limit information storage unit 34 stores the expiration period of the printing password. The time limit information storage unit 34 permits the document image for which the printing time limit has been set to be printed before the printing time limit elapses. Meanwhile, the time limit information storage unit 34 restricts the document image for which the printing time limit has been set from being printed after the printing time limit elapses.

After the printing password expires, when the document image associated with the printing password has not been ever printed in the second image processing apparatus 40, the time limit information storage unit 34 creates, for the sender, an unprinted document image notification indicating that the document image has not been printed within the printing time limit and transmits the created notification to the first image processing apparatus 20.

The fee charge information storage unit 35 stores information of fee charge to a sender or a recipient which arises from sending of a document by the sender or a reception of a document by the recipient.

For example, when a sender sends a document file, and the management server 30 receives a document image, the fee charge information storage unit 35 charges a predetermined fee to the sender.

[Functional Configuration of Second Image Processing Apparatus 40]

Figure 7:
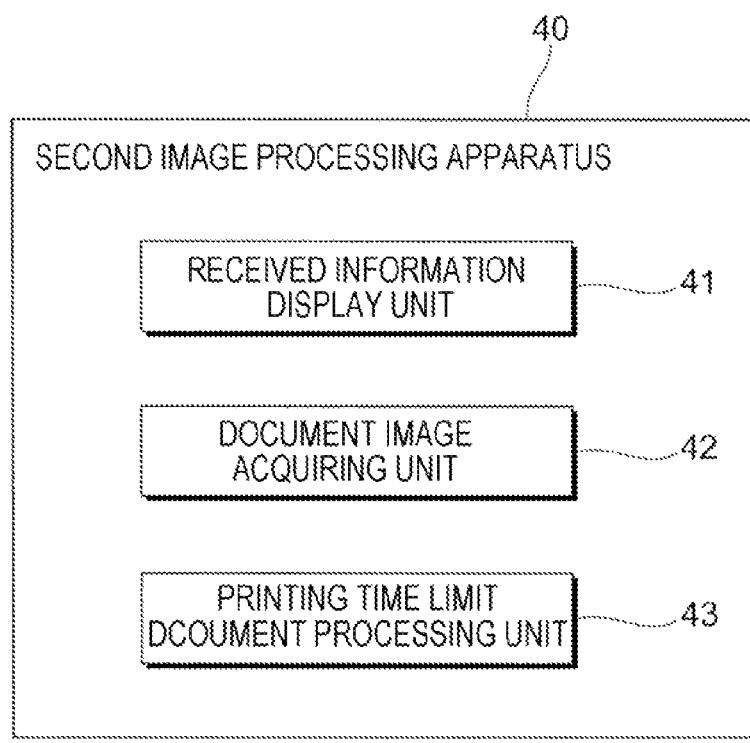
FIG. 7 is a functional block diagram of the second image processing apparatus of the exemplary embodiment 1.

FIG. 7 is a functional block diagram of the second image processing apparatus 40 of the exemplary embodiment 1.

As illustrated in FIG. 7, the second image processing apparatus 40 includes a received information display unit 41 that causes information about the document transmission/ reception service to be displayed, a document image acquiring unit 42 that acquires a document image, and a printing time limit document processing unit 43 that processes a document image for which a printing time limit has been set.

The received information display unit 41 causes the UI unit 110 to display various messages for the present service. For example, when there is a document image that has not been received, the received information display unit 41 displays a notification indicating the existence of the document image that has not been received, to the recipient who is logging in to the second image processing apparatus 40.

In addition, when a printing time limit has been set for a document image, the received information display unit 41 displays the existence of the document image for which the printing time limit has been set.

The document image acquiring unit 42 acquires the document image that has been transmitted to the recipient who is logging in, from the management server 30. Then, the document image acquiring unit 42 causes the acquired image to be printed in the image forming unit 118.

The printing time limit document processing unit 43 acquires the document image for which the printing time limit has been set, from the management server 30. Then, when the printing time limit has not elapsed, the printing time limit document processing unit 43 causes the document image to be printed in the image forming unit 118. Meanwhile, when the printing time limit has elapsed, the printing time limit document processing unit 43 performs a printing based on the document image, according to a predetermined condition.

The printing time limit document processing unit 43 performs the processing of changing a printing mode to be different before and after a printing time limit elapses, in printing out the document image for which the printing time limit has been set. The printing time limit document processing unit 43 receives a document image for which a printing time limit has been set. When a recipient inputs a printing password, the printing time limit document processing unit 43 prints the document image in a printing mode before the printing time limit elapses as long as the printing password is effective. Meanwhile, when the printing password is not effective, the printing time limit document processing unit 43 restricts the document image from being printed in the printing mode before the printing time limit elapses, and performs a printing in a printing mode different from the printing mode before the printing time limit elapses based on the document image.

In the exemplary embodiment 1, the printing time limit document processing unit 43 may perform processing of changing printing contents related to contents of a document image to be printed (hereinafter, referred to as "printing content changing processing") and processing of changing a printing operation related to an operation at the time of printing a document image (hereinafter, referred to as "printing operation changing processing"), as the processing of changing a printing mode to be different before and after a printing time limit elapses.

Subsequently, specific descriptions will be made on the processing that is performed by the printing time limit document processing unit 43 to change a printing mode to be different before and after a printing time limit elapses.

Figure 8A:
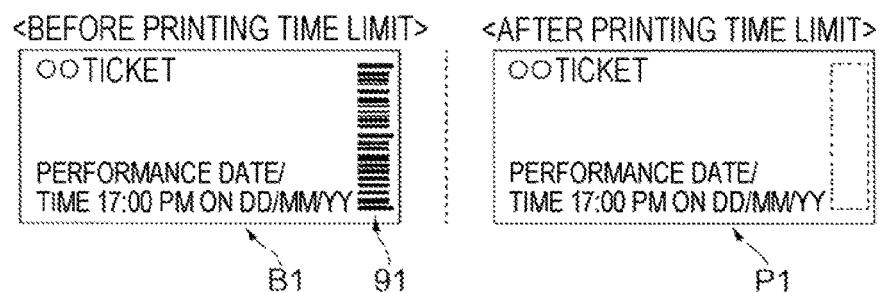
FIGS. 8A to 8C are views for explaining processing of changing a printing mode to be different before and after a printing time limit elapses.
Figure 8B:
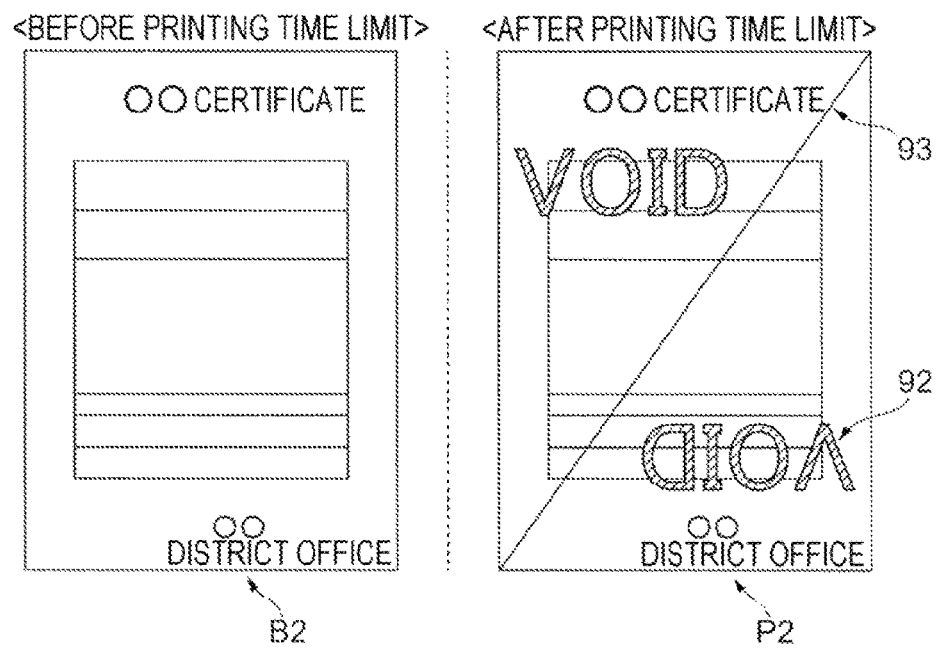
Figure 8C:
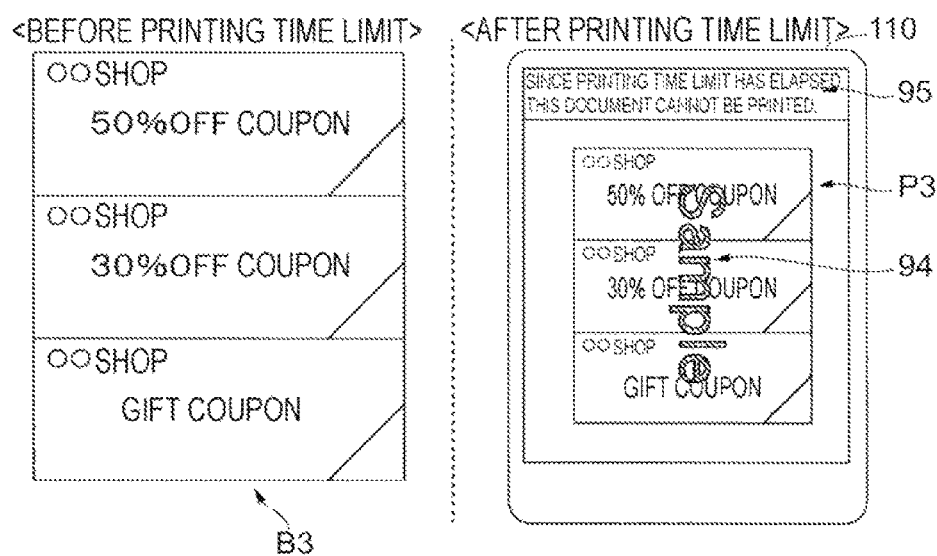

FIGS. 8A to 8C are views for explaining the processing of changing a printing mode to be different before and after a printing time limit elapses.

(Printing Content Changing Processing)

In the exemplary embodiment 1, the printing content changing processing provides (1) an original assurance mode, (2) a void indication mode, and (3) a printing page number mode.

(1) Original Assurance Mode

In the original assurance mode, when the original setting has been performed for a document image, the originality of a paper printing document is assured before a printing time limit elapses and is not assured after the printing time limit elapses.

Specifically, the identification information image is printed on a paper printing document before the printing time limit elapses and is not printed on a paper printing document after the printing time limit elapses. For example, as illustrated in FIG. 8A, in a case of a ticket B1 having the expiration period, a barcode 91 is printed as the identification information image on the ticket B1 which is printed before a printing time limit elapses. Meanwhile, the barcode is not printed on a ticket P1 which is printed after the printing time limit elapses.

(2) Void Indication Mode

In the void indication mode, when a printing is performed based on the same document image, a paper printing document before a printing time limit elapses has validity as a document, and a paper printing document after the printing time limit elapses is explicitly indicated as a void document.

Specifically, as illustrated in FIG. 8B, a document image is directly printed as a paper printing document before a printing time limit elapses. Meanwhile, after the printing time limit elapses, an image indicating that the document is void due to an elapse of the printing time limit of the document image is superposed and printed on the original document image. For example, a certificate B2 which is contents of an original document image is printed before a printing time limit elapses. Meanwhile, after the printing time limit elapses, a certificate P2 is printed in the manner that a text image 92 explicitly indicating a void document such as "VOID" or a slanted line image 93 is superposed on the original document image.

(3) Printing Page Number Changing Mode

In the printing page number changing mode, when a printing is performed based on the same document image, the number of pages of a paper printing document before a printing time limit elapses is made different from the number of pages of a paper printing paper after the printing time limit elapses. Specifically, entire (all) pages of a document image are printed before a printing time limit elapses. Meanwhile, after the printing time limit elapses, only a part of the document image, for example, only the first page of the document image as the cover page is printed.

(Printing Operation Changing Processing)

In the exemplary embodiment 1, the printing operation changing processing provides (1) a retransmission mode, (2) a fee charge changing mode, (3) a content indication mode, and (4) a printing trigger changing mode.

(1) Retransmission Mode

In the retransmission mode, after a printing time limit elapses, the UI unit 110 is caused to display a request screen which is not displayed before the printing time limit elapses, for requesting a retransmission of the printing password. Specifically, after the printing time limit elapses, a request screen is displayed to request a retransmission of the printing password for printing the document image of which the printing time limit has elapsed.

At this time, the request screen may display a request screen for requesting a sender to recreate the document image of which the printing time limit has elapsed.

(2) Fee Charge Changing Mode

In the fee charge changing mode, a fee that may be incurred from the printing of a document image before a printing time limit elapses is made different from a fee that may be incurred from the printing of the document image after the printing time limit elapses. Specifically, no fee is charged to a recipient when the recipient prints a document image, before a printing time limit elapses. However, after the printing time limit elapses, a fee is charged to a recipient when the recipient prints the document image. After the fee charge is confirmed, the printing of the document image of which the printing time limit has elapsed is permitted again.

(3) Content Indication Mode

In the content indication mode, modes before and after a printing time limit elapses change between printing a document image and confirming contents of the document image. Specifically, as illustrated in FIG. 8C, a document image is directly printed as a paper printing document B3 before a printing time limit elapses. Meanwhile, after the printing time limit elapses, the printing of the document image is not permitted, and a reference image P3 confirming the contents of the document image is displayed on the screen of the UI unit 110.

In this case, the reference image P3 displayed on the screen of the UI unit 110 is set not to be printed. In addition, even when the reference image P3 may be printed, a void image such as "Sample" is superimposed and printed on the reference image P3 to explicitly indicate that the contents of the printed reference image P3 are void.

Further, the screen of the UI unit 110 displays a text message image 95 describing that the document image with the contents displayed on the screen may not be printed as a paper printing document due to elapse of the printing time limit.

(4) Printing Trigger Changing Mode

In the printing trigger changing mode, a printing trigger changes to be different before and after a printing time limit elapses. Specifically, before a printing time limit elapses, the printing of a document image for which the printing time limit has been set is performed at a timing of a user's printing instruction. Meanwhile, after the printing time limit elapses, the printing of the document image for which the printing time limit has been set is performed, regardless of the timing of the user's printing instruction. For example, when there is a document image of which a printing time limit has elapsed, the document image of which the time limit has elapsed is continuously forcibly printed immediately after a recipient logs in to the second image processing apparatus 40 or when another document image for which a printing time limit has not been set is printed.

In this case, when a paper printing document is printed based on a document image after elapse of a printing time limit, the printing time limit document processing unit 43 may notify a sender that the document image is printed in one of the above-described modes after the printing time limit elapses and notify the sender of the printing mode of the document image in that case.

[Exemplary Operation of Transmitting/Receiving System]

Subsequently, descriptions will be made on an example where a sender transmits a document image to a recipient from the first image processing apparatus 20 through the terminal device 10. Here, the sender uses the first image processing apparatus 20 installed in, for example, an office as a sender side device. In addition, a recipient uses the second image processing apparatus 40 installed in a convenience store as a recipient side machine. A type of transmission/reception for document data is the printing time limit transmission/reception. In addition, the original setting is performed for the document data.

Figure 9:
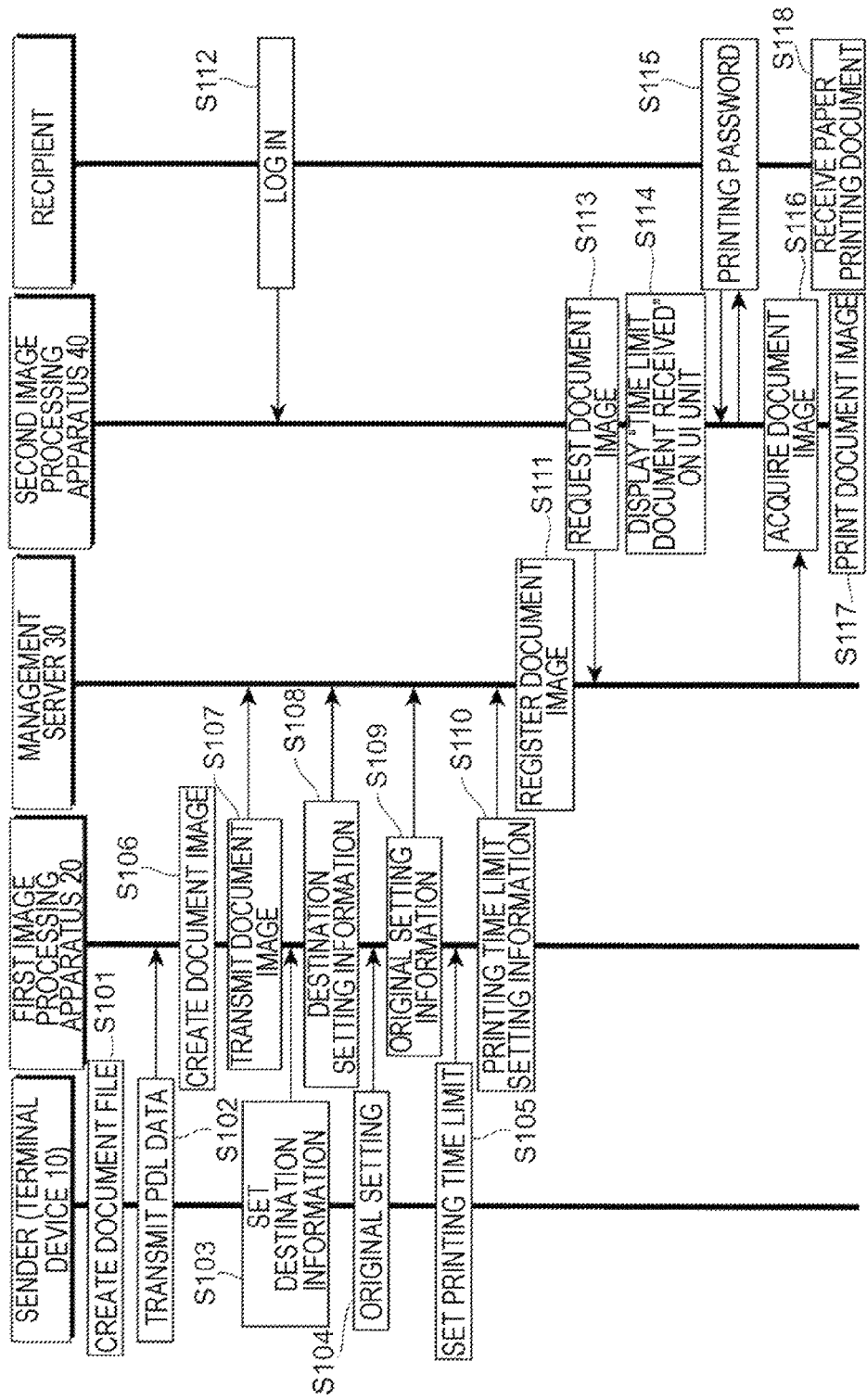
FIG. 9 is a sequence chart of the document transmitting/receiving system of the exemplary embodiment 1.

FIG. 9 is a sequence chart of the document transmitting/receiving system of the exemplary embodiment 1.

As illustrated in FIG. 9, the sender creates the document file such as a letter in the terminal device 10 (step (hereinafter, referred to as "S") 101). Then, the sender performs an operation to send the document to the recipient on the send screen (see FIGS. 5A and 5B) displayed on the display mechanism 100d of the terminal device 10. Then, the terminal device 10 creates PDL data of the document file and transmits the PDL data to the first image processing apparatus 20 (S102).

In addition, in the sending operation, the sender designates a specific recipient by setting destination information of the document file (S103). Further, a sender performs the original setting for a paper printed document (S104). Then, the sender sets a printing time limit (S105).

Then, the first image processing apparatus 20 creates a document image based on the acquired PDL data (S106). In addition, the first image processing apparatus 20 transmits the document image to the management server 30 (S107).

In addition, the first image processing apparatus 20 transmits the destination setting information to the management server 30 (S108). Then, the first image processing apparatus 20 transmits the original setting information to the management server 30 (S109). In addition, the first image processing apparatus 20 transmits the printing time limit setting information to the management server 30 (S110).

Then, the management server 30 registers the document image (S111). In registering the document image, for example, storing the document image, designating a destination for the stored document image, registering an identification information image, and setting a printing time limit are performed.

In the exemplary embodiment 1, a predetermined fee is charged to the sender at a timing when the document image is transmitted from the sender to the management server 30.

Meanwhile, the recipient performs a log-in authentication to the second image processing apparatus 40 installed in, for example, a convenience store (S112).

Thereafter, the second image processing apparatus 40 requests the management server 30 to receive the document image that has been transmitted to the recipient who is performing the log-in (S113). Then, when there is a document image for which a printing time limit has been set, the second image processing apparatus 40 causes the UI unit 110 to display the existence of the document image for which the printing time limit has been set, such as "Time-Limited Document Received" (S114).

Then, the second image processing apparatus 40 requests the recipient to input a printing password for printing the document image for which the printing time limit has been set (S115). Here, when a printing password within the expiration period is input as an input of a printing password, the second image processing apparatus 40 acquires the document image (S116). In addition, the second image processing apparatus 40 prints the document image (S117). Then, the recipient receives the paper printing document (S118).

Meanwhile, when a printing password which has expired is input as an input of a printing password, the second image processing apparatus 40 prints a printing mode different from the printing mode of the document image within the printing time limit.

Exemplary Embodiment 2

Subsequently, a document transmitting/receiving system 1 of an exemplary embodiment 2 will be described. In the exemplary embodiment 2, the same components as those in the exemplary embodiment 1 will be denoted by the same reference numerals as used in the exemplary embodiment 1, and detailed descriptions thereof will be omitted.

Figure 10:
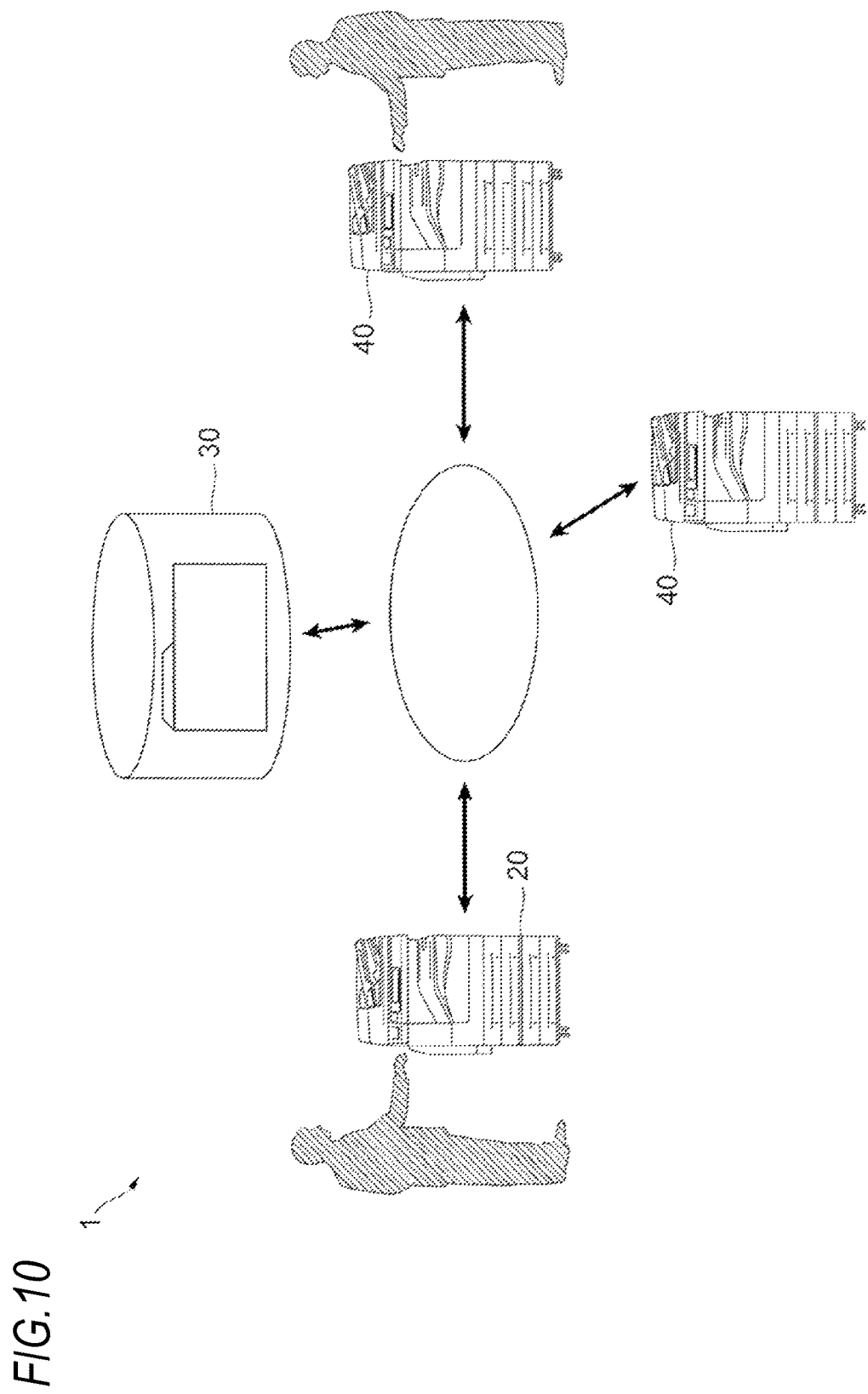
FIG. 10 is a view illustrating an exemplary configuration of a document transmitting/receiving system of an exemplary embodiment 2.

FIG. 10 is a view illustrating an exemplary configuration of the document transmitting/receiving system 1 of the exemplary embodiment 2.

As illustrated in FIG. 10, the document transmitting/receiving system 1 includes the first image processing apparatus 20, the management server 30, and the plural second image processing apparatuses 40. In the exemplary embodiment 2, the sender side machine is the first image processing apparatus 20, and the recipient side machine is the second image processing apparatuses 40.

In the exemplary embodiment 2, it is assumed that the first image processing apparatus 20 is directly operated without the terminal device 10 which is used in the exemplary embodiment 1. For example, a case where the first image processing apparatus 20 is installed in, for example, a convenience store may be taken into account.

A sender transmits document data by directly operating the first image processing apparatus 20. Specifically, the sender causes a document to be read by the image reading unit 119 of the first image processing apparatus 20 or document data recorded in a recording medium to be read by the first image processing apparatus 20. Thereafter, the document transmitting unit 21 of the first image processing apparatus 20 creates a document image based on the document data.

In the exemplary embodiment 2, the UI unit 110 displays the send screen (see FIG. 5B). In addition, the sender sets a recipient or a printing time limit of the document to be transmitted, on the screen of the UI unit 110.

In this way, the document data is transmitted from the first image processing apparatus 20 to the management server 30. Thereafter, the recipient prints the document image in, for example, the second image processing apparatus 40 so that a paper printing document is received by the recipient.

In the exemplary embodiment 2 as well, a printing mode of a paper printing document changes before and after a printing time limit elapses as in the exemplary embodiment 1.

Exemplary Embodiment 3

Subsequently, a document transmitting/receiving system 1 of an exemplary embodiment 3 will be described. In the exemplary embodiment 3, the same components as those in the exemplary embodiment 1 will be denoted by the same reference numerals as used in the exemplary embodiment 1, and detailed descriptions thereof will be omitted.

Figure 11:
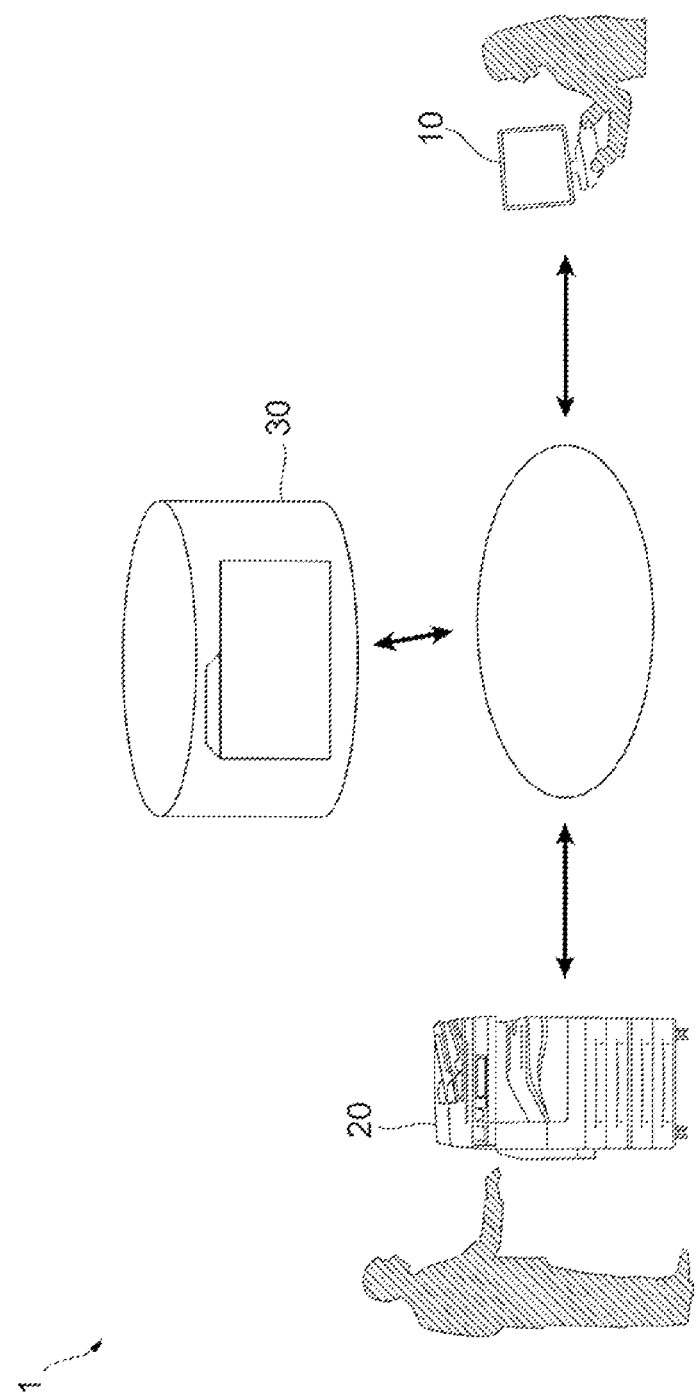
FIG. 11 is a view illustrating an exemplary configuration of a document transmitting/receiving system of an exemplary embodiment 3.

FIG. 11 is a view illustrating an exemplary configuration of the document transmitting/receiving system 1 of the exemplary embodiment 3.

As illustrated in FIG. 11, the document transmitting/receiving system 1 includes the first image processing apparatus 20, and the management server 30, and the terminal device 10. In the exemplary embodiment 3, the sender side machine is the first image processing apparatus 20, and the recipient side machine is the terminal device 10.

In the exemplary embodiment 3, a sender transmits a document image by directly operating the first image processing apparatus 20. Specifically, the sender causes a document to be read by the image reading unit 119 of the first image processing apparatus 20 or document data recorded in a recording medium to be read by the first image processing apparatus 20. Thereafter, the document transmitting unit 21 of the first image processing apparatus 20 creates a document image based on the document data.

Meanwhile, a recipient logs in to the document transmitting/receiving system 1 through the terminal device 10. The terminal device 10 downloads the document image and outputs the document image as an electronic file such as portable document format (PDF).

As described above, in the exemplary embodiment 3, the document data is transmitted from the first image processing apparatus 20 to the management server 30. Thereafter, the recipient outputs the document data in, for example, the terminal device 10 so that the electronic file of the document data is received by the recipient.

In the exemplary embodiment 3 as well, a printing mode of document data changes to be different before and after a printing time limit elapses. Specifically, in the exemplary embodiment 3, a document image is output by an electronic file such as a PDF, but the contents of the electronic file change before and after the printing time limit elapses.

In the exemplary embodiments 1 to 3, the configurations of the functional units for implementing the present service in the terminal device 10, the first image processing apparatus 20, the management server 30, and the second image processing apparatus 40 are not limited to the aspects of the exemplary embodiment 1. For example, in the exemplary embodiment 1, the printing time limit document processing unit 43 of the second image processing apparatus 40 performs the processing of changing contents of a printed image. However, the management server 30 may perform the processing. That is, the management server 30 may hold plural document images in advance so as to change the contents of a document image before and after a printing time limit elapses. In addition, when sending a document image to the second image processing apparatus 40, the management server 30 may create document images which are different from each other before and after a printing time limit elapses.

In the exemplary embodiments 1 to 3, the management server 30 is caused to transmit the document image of the document file. However, instead of the document image, PDL data of the document file may be transmitted.

A program which causes a computer to implement the functions of the respective components in the present exemplary embodiments may be provided, for example, by a communication unit or in a state of being stored in various recording media.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An output apparatus comprising:
    an acquisition unit configured to acquire document data having an output time limit and identification information used for identification; and
    an output unit configured to output the document data in a first output form of the identification information when the output time limit has elapsed, which is different from a second output form of the identification information before expiration of the output time limit.

2. The output apparatus according to claim 1, wherein when the output time limit has elapsed, the output unit outputs, based on the document data, contents different from output contents of the document data before the output time limit elapses.

3. The output apparatus according to claim 2, wherein
    the output unit imparts predetermined information to the document data when the document data is output before expiration of the output time limit, and
    the output unit does not impart the predetermined information to the document data when the document data is output after the output time limit elapses.

4. The output apparatus according to claim 2, wherein when the output time limit has elapsed, the output unit outputs only a part of the document data.

5. The output apparatus according to claim 1, wherein when the output time limit has elapsed, the output unit outputs the document data with an operation different from an operation to output the document data before the output time limit elapses.

6. The output apparatus according to claim 5, wherein when the output time limit has elapsed, the output unit forcibly outputs the document data, regardless of a recipient's operation for the document data.

* * * * *